Sept. 25, 1962                L. PÉRAS                3,056,017
ELECTRONIC REGULATOR FOR WELDING APPARATUS
Filed Sept. 16, 1957
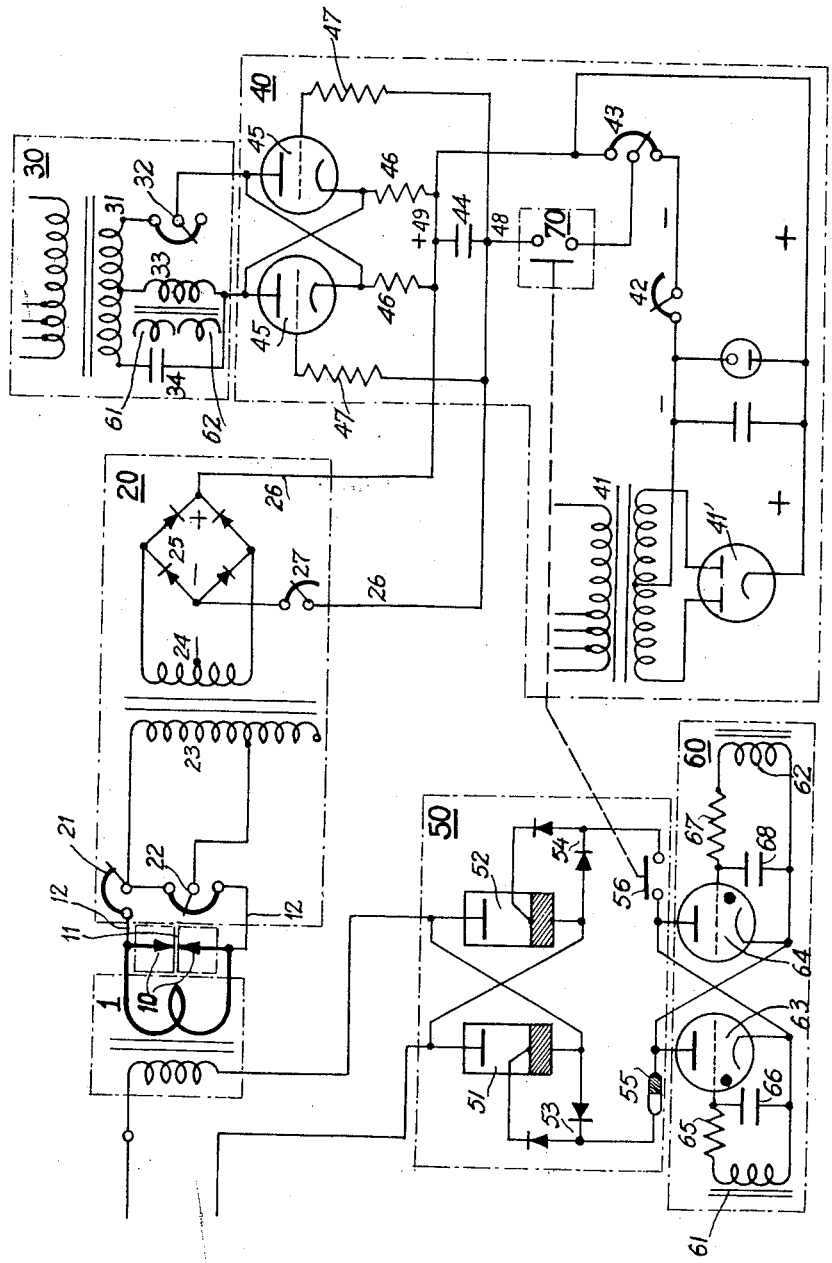
INVENTOR
Lucien Péras
By
ATTORNEYS United States Patent Office 3,056,017
Patented Sept. 25, 1962

3,056,017
ELECTRONIC REGULATOR FOR WELDING
APPARATUS
Lucien Péras, Billancourt, France, assignor to Regie Nationale des Usines Renault, Billancourt (Seine), France
Filed Sept. 16, 1957, Ser. No. 684,091
Claims priority, application France Sept. 29, 1956
9 Claims. (Cl. 219—114)

It is well known to specialists in resistance and spot welding that the main welding parameters to be carefully adjusted if it is desired to produce quality welds may be summarized as follows:

Regulating the secondary current through any means; adjusting the time period during which the current flows through the workpieces; adjusting the pressure between the electrodes; adapting the dimensions of the operating portions of the electrodes as a function of the thicknesses to be welded as well as a function of the other parameters.

Besides, it is known that if it is assumed that the parameters: Secondary Current, Current Passage Period, and Electrode Size are pre-adjusted for welding two sheets or plates of well-defined thickness, any increase in the pressure applied to the electrode with respect to a pressure value giving so-called "good" welds will result in low quality welds. Similarly, any decrease in the electrode pressure will give a so-called "burnt" weld characterized by the projection of molten particles.

On the other hand, assuming that the parameters: Secondary Current, Current Passage Period, Electrode Pressure are already known and pre-adjusted in the case of two plates of well-defined thickness, a same pair of electrodes will impart different physical characteristics to the welded spot at the first passage of current producing the first welding spots and to take a practical example—at the 2,000th welding spot. In this last case the area of the operating portion of each electrode has increased, the current density per square inch decreased, and the welding spot pertains to the low-quality type.

Moreover, assuming that all the aforesaid parameters— Current Strength—Welding Time Period—Electrode Pressure—Size of Electrode Working Portions—are pre-adjusted, the introduction of metal parts of different dimensions and volumes in the space between the arms of the welding apparatus will modify the characteristics of the welding spots due to the increase in the secondary impedance which causes a reduction in the value of the secondary current.

From a predetermined adjustment giving a good-quality weld the introduction of metal parts of sundry dimensions and volumes may lead to welding spots of poor quality, according to the values of these dimensions and volumes.

It is already known to utilize a thyratron electron device controlling a set of ignitrons disposed in converse parallel relationship in the primary circuit of a welding transformer, this device being adapted to be associated with a complementary outphasing device providing an extremely flexible variation in the primary current and, consequently, in the secondary current.

Furthermore, a device of this character may be provided with a complementary outphasing variation device from an input level to a predetermined final level, and give in a predetermined time period a variation in the primary current according to a predetermined law. The secondary current passing through the plates to be assembled follows the same predetermined variations as the primary current.

These electronic devices, while improving the quality of the welding spots, are not capable of maintaining this quality to a constant, reliable value when a variation occurs in any of the aforesaid parameters, for example the electrode pressure, a substantial decrease in the feed voltage, the untimely insertion of metal pieces between the arms of the welding apparatus, a variation in the physical dimensions of the operating portions of the electrodes, or an insufficient spacing between two or more welding spots.

In order to preserve a constant quality of the welding spots with time, irrespective of the possible variations set forth hereabove, it is the essential object of this invention to associate with an electronic thyratron device provided with an outphasing system of any character a phase-shift correcting device which is directly responsive to the current flowing through the electrodes clamping the plates to be assembled.

The device according to this invention will then act as a self-regulator which, in spite of the aforesaid variations and within the limits of the maximum capacity of the welding apparatus, will ensure the maximum regularity in the quality of the welding spots while being immediately and easily adaptable to the welding of plates of different thicknesses.

In order to afford a clearer understanding of the present invention and of the manner in which the self-regulator constituting the subject-matter thereof may be embodied in the practice, reference will now be made to the accompanying drawing forming part of this specification and illustrating diagrammatically by way of example a typical wiring diagram and arrangement of a thyratron and ignitron device provided with an outphasing system of the resistance-and-capacitor type and constructed in accordance with the teachings of this invention.

In the drawing, the welding transformer 1 comprises electrodes 10 adapted to clamp the plates 11 to be welded.

The rectangle 20 is the block diagram of the device providing the self-regulating action which is connected to the electrodes through wires 12 and to the outphasing variation device 40 through other conductors 26.

The self-regulating unit 20 comprises a variable resistor 21, a potentiometer 22, a transformer 23, 24 the secondary of which delivers current to a full-wave rectifier 25 connected through wires 26 to the outphasing variation device 40.

The rectangle 30 represents a conventional outphasing device which is already known per se and comprises a transformer secondary winding 31 having a center tap and its ends associated with a variable resistor 32 and a capacitor 34, respectively.

The central tap feeds a transformer 33 the two secondaries 61, 62 of which are connected to the power thyratrons 63 and 64 (block diagram 60) respectively.

The block diagram 40 illustrates the outphasing variation device. This device comprises a D.C. system wherein the direct current is supplied from a transformer 41 the secondary of which is connected to a double diode 41' to rectify each alternation. This rectified current is suitably filtered and regulated. It flows through a variable resistor 42 and a potentiometer 43 having connected across its terminals a capacitor 44 and a normally open contact 70 adapted to close the circuit at the end of the so-called "approach" time period as determined by a standard-type time-lag device having the four usual functions: approaching, welding, keeping and repeating. The same capacitor 44 is connected through wires 26 to the aforesaid rectifier 25 and is positioned between the grids and cathodes of a double-triode vacuum tube 45. Resistors 47 are inserted for the purpose of protecting the grids and other resistors 46 are connected in parallel with each cathode of the double-triode 45.

The two anodes of the double-triode 45 are connected to the capacitor 34 and resistor 32 of the outphasing bridge 30, respectively.

The block diagram 50 illustrates an electron contactor of conventional type wherein the reference numerals 51, 52 designates the two ignitrons mounted in converse parallel relationship, 53, 54 being conventional-type rectifiers and 55 a protective fuse. The contact 56 closes at the same time as the aforesaid contact 70 at the end of the time period required to attain the necessary electrode pressures on the plates to be assembled.

The block diagram 60 represents the power-thyratron device controlling the ignitron circuit. As illustrated in this diagram the thyratron device also acts as a relay means. This conventional-type device comprises two power thyratrons 63, 64 mounted in converse parallel relationship and has connected between its grid and cathode terminals the secondaries 61, 62 of the transformer 33 of the outphasing bridge.

The power supply to thyratrons 63, 64 is completed by resistors 65, 67 and capacitors 66, 68.

The operation of the complete asembly just described is as follows:

At the end of the time period required to develop the necessary electrode pressure on the plates to be assembled the contact 70 is closed as well as the contact 56 in the ignitron-firing circuit.

From this moment on the current flows through the primary winding of transformer 1 and the current wave is determined by the outphasing systems 30 and 40.

In fact, the capacitor 44 is charged at a potential subordinate to the respective values of resistance 42 and potentiometer 43. Thus, the current circulating through the double triode 45 is a function of the biasing voltage developing between the grid and cathode.

The total resistance of the outphasing bridge is therefore the sum of the resistance 32 and of the internal resistance of the double triode. This total resistance in series with capacitor 34 determines the phase shift of the primary of transformer 33 and, therefore, of the control thyratrons 63 and 64.

The primary current wave of the power circuit is outphased as well as the secondary current wave. The welding current flows through the plate 11 to be assembled and gives a certain voltage across the electrode terminals at points 12.

This voltage or voltage fraction according to the adjustment of the resistors and potentiometers 21 and 22 is amplified by the transformer 23, 24 and converted into direct current by the bridge rectifier 25. This D.C. charges through the wires 26 the capacitor 44.

Now, this capacitor 44, when the contact 70 has been re-closed at the end of the approach period, was charged beforehand to a well-defined value through the assembly 41, 42, 43. The charge of capacitor 44 is therefore subordinate to the voltage obtaining at points 48 and 49. This resultant voltage is adjusted automatically by the two partial voltages issuing the one from group 40 and the other from group 20.

Any increase in the efficient voltage value of group 20 produces an outphasing of the welding circuit which is of greater importance than the outphasing of the preceding period, and therefore a welding-current efficient value lower and a reduction in the efficient value of the voltage across the electrode terminals.

Any decrease in the efficient voltage value of group 20 produces an outphasing in the welding circuit which is lower than the outphasing of the preceding period and therefore a more important welding-current efficient value, and an increase in the efficient value of the voltage across the electrode terminals.

In this last case the outphasing limit is obtained when the efficient value of the welding current attains 0.707 of the maximum value.

Assuming for example that during a welding operation the efficient value of the voltage across the electrode terminals increases, this will cause a corresponding increase on the direct current in the rectifier 25 and an increase in the voltage measured across the terminals 48, 49 of capacitor 44. This will occasion a more negative biasing of the grid of the double-triode 45 and therefore a lower anode-to-cathode current, leading in turn to a greater internal resistance.

This increased internal resistance of the double-triode is added to the adjusted resistor 32 of the outphasing bridge and produces a more important phase displacement across the secondaries 61 and 62 of transformer 33.

The power thyratrons 63, 64 are outphased in their respective circuits 61, 65, 66, in the case of tube 63, and circuits 62, 67, 68 in the case of tube 64.

The ignitrons 51, 52 are outphased in turn by the same value and the efficient value of the primary current of transformer 1 is thus reduced. Consequently, the efficient value of the secondary current flowing through the plates 11 clamped between the electrodes is reduced. The same applied to the efficient voltage value as this voltage is less important and causes as before but in the reverse direction a variation in the charge of capacitor 44. The biasings of the double triode 45 are then less negative than before, the anode-cathode current becomes more important, and the internal resistance decreases. At least, this occasions a minor outphasing and a greater efficient value of the secondary current, this example illustrating clearly the self-regulating action exerted by the device of this invention.

A device constructed according to these principles is characterized notably by the following advantages:

All weld spots are of same quality, without occassioning any projection of molten particles irrespective of the degree of wear of the electrodes, up to the maximum efficient value of the current that the transformer utilized may yield.

All weld spots are of same quality, irrespective of the value of the pressure exerted on the electrodes within the limits consistent with the operation of the members utilized for clamping the plates to be welded for a given welding operation.

All weld spots are of same quality, irrespective of the instantaneous voltage variations occurring in the main welding network.

All weld spots are of same quality, irrespective of the impedance changes that may take place in the secondary circuit on account of the introduction of magnetic materials during the welding of a line of spots.

All weld spots are of the same quality, irrespective of any modifications that may be brought simultaneously to several parameters, for example the variation in the electrode pressure and an unforeseen instantaneous voltage drop in the supply mains.

Finally, this device is characterized by the appreciable advantage that electrode maintenance and replacement operations are less frequently required.

Of course, the device shown and described herein constitutes a simple exemplification of the practical embodiment of the basic principles of the invention and anyone conversant with the art may easily bring thereto any modifications as suggested by the specific application and conditions contemplated, without departing from the spirit and scope of the invention as set forth in the appended claims.

Thus, it is possible in the block unit 20 to substitute an electronic amplifier for the transformer 23, 24, or any other electrical device providing a suitable amplification of the efficient value of the welding voltage obtaining across the electrode terminals.

Similarly, regarding the block unit 30, any known type of outphasing device may be used, whether of the resistor-capacitor type or of the resistance, self-inductance type.

It will also be noted that regarding the block unit 60 any known and suitable device may be used for controlling the power thyratrons associated with the ignitrons inserted in the primary circuit of the main transformer;

besides, in this case two known main types of control may be used: an asynchronous control as in the above-described device, or a synchronous control whereby the power thyratrons are connected in parallel, with, in addition, a synchronizing device.

The self-regulating device according to this invention may be used in other applications than those indicated herein in connection with resistance welding.

In fact, it is possible to use the same principle in automatic arc welding with A.C. feed and according to any desired welding pattern. In this case, the current self-regulating characteristic is obtained by measuring the voltage across the terminals consisting of the consumable electrode and of the weld piece.

What is claimed is:

1. In an electrical system including an alternating current source, a load unit adapted to receive a voltage-variable load, and an outphasing device regulating the wave shape applied to said load unit from said source, a translating device connected to said unit to respond to load voltage variations and including an alternating current bridge circuit having a pair of output terminals, means varying the phase of the potentials at said terminals in accordance with said load voltage variations, and means controlling said outphasing device in accordance with the phase variations of said potentials.

2. In an electrical system including an alternating current source, a load unit adapted to receive a voltage-variable load, and an outphasing device connected to regulate the wave shape applied to said load unit from said source, a translating device connected to said unit to respond to load voltage variations and including an alternating current bridge circuit having a branch comprising a reactance and a resistance connected in series, means to develop a circulating current through said branch in accordance with said load voltage variations, whereby to vary the phase of the potential at the junction between said reactance and resistance, and means controlling said outphasing device in accordance with the phase variations of said potential.

3. In an electrical system including an alternating current source, a load unit adapted to receive a voltage-variable load, and an outphasing device connected to regulate the wave shape applied to said load unit from said source, an alternating current bridge circuit including a branch containing a reactance and resistance means in series therewith and conducting circulating current therethrough, whereby the voltage across said reactance varies in accordance with said circulating current, means varying said resistance means in accordance with load voltage variations, and means controlling said outphasing device in accordance with the voltage across said reactance.

4. In an electrical system including an alternating current source, a load unit adapted to receive a voltage-variable load, and an outphasing device connected to regulate the wave shape applied to said load unit from said source, an alternating current bridge circuit including a branch containing a reactance and a vacuum tube connected in series therewith to conduct a circulating current, means varying the conductance of said vacuum tube in accordance with load voltage variations, whereby to vary said circulating current and the voltage across said reactance, and means controlling said outphasing device in accordance with the voltage across said reactance.

5. In an electrical system including an alternating current source, a load unit adapted to receive a voltage-variable load, and an outphasing device connected to regulate the wave shape applied to said load unit from said source, a thyratron device operatively associated with said outphasing device, an alternating current bridge circuit including a branch containing a reactance and variable resistance means in series therewith to conduct a circulating current, means varying said resistance means in accordance with load voltage variations, means in said bridge circuit connected to the junction of said reactance and variable resistance means and developing a potential varying in phase in accordance with variations in said circulating current, and means operating said thyratron device in accordance with said potential.

6. In combination, a welding unit including a welding transformer having a primary and a secondary, welding electrodes connected to said secondary and adapted to receive weldable material therebetween, whereby to develop a variable voltage thereacross, an alternating current source, and an outphasing device connected in circuit with said source and said primary and connected to regulate the wave shape applied to said primary from said source, an alternating current bridge circuit including a branch containing a reactance and resistance means in series therewith and carrying circulating current therethrough, means varying said circulating current in accordance with variations in voltage across said electrodes, whereby to vary the phase of the potential at one of the terminals of said reactance, and means controlling said outphasing device in accordance with the phase variations at said one of the terminals of the reactance.

7. In combination, a welding unit including a welding transformer having a primary and a secondary, welding electrodes connected to said secondary and adapted to receive conductive weldable material therebetween, whereby to develop a variable voltage thereacross, an alternating current source, and an outphasing device connected in circuit with said source and said primary and connected to regulate the wave shape applied to said primary from said source, a thyratron device operatively associated with said outphasing device, an alternating current bridge circuit including a branch containing a reactance and a vacuum tube connected in series therewith and carrying a circulating current, means varying the conductance of said vacuum tube in accordance with variations in voltage across said electrodes, whereby to vary the phase of the potential at one of the terminals of said reactance, and means operating said thyratron device in accordance with said potential.

8. A welding apparatus of the alternating current type comprising a welding transformer having a pair of welding electrodes connected to its secondary, an electronic contactor connected in the primary circuit of said transformer, a thyratron device controlling said contactor, an outphasing circuit including a reactive branch comprising a reactance and a vacuum tube connected in series, means connecting said thyratron device to said reactance to control the intensity of the welding current wave, and means controlling the conductance of said vacuum tube in accordance with voltage variations across the welding electrodes.

9. A welding apparatus of the alternating current type comprising a welding transformer having a pair of welding electrodes connected to its secondary, an electronic contactor connected in the primary circuit of said transformer, a thyratron device controlling said contactor, an outphasing circuit including a reactive branch comprising a reactance and a vacuum tube connected in series, bias means connected to said vacuum tube and including a condenser connected to control the conductance of the vacuum tube in accordance with the D.C. voltage existing at the terminals of the condenser, means connecting said thyratron device to said reactance to control the intensity of the welding current wave, and means controlling the D.C. voltage at the terminals of the condenser in accordance with voltage variations across the welding electrodes.

References Cited in the file of this patent

UNITED STATES PATENTS

| | | |
|---|---|---|
| 2,472,041 | Davies | May 31, 1949 |
| 2,472,043 | Callender | May 31, 1949 |
| 2,537,767 | Langenwalter | Jan. 9, 1951 |
| 2,602,155 | Michelet | July 1, 1952 |
| 2,848,595 | Van Sciver | Aug. 19, 1958 |